Figure 1:
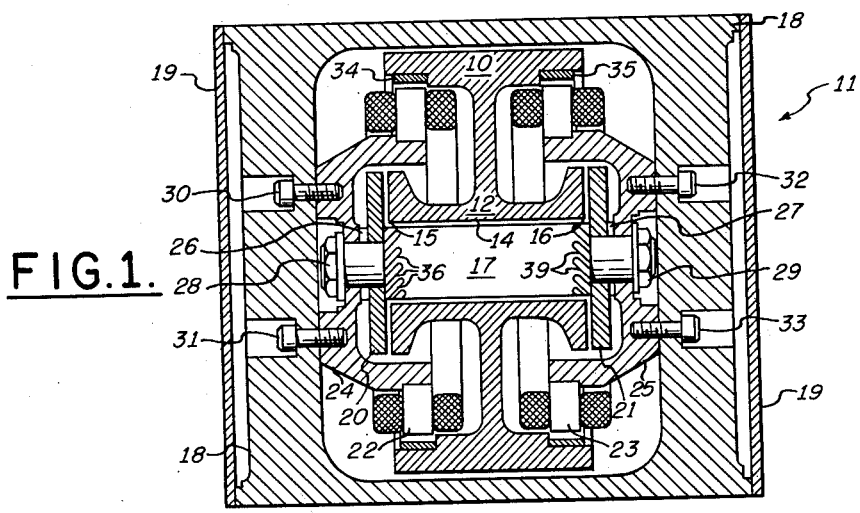

Aug. 25, 1964  R. J. BENATTI  3,146,036

GAS BEARINGS

Filed May 29, 1962

INVENTOR.
ROBERT J. BENATTI
BY
Arthur H. Serrell
ATTORNEY

3,146,036
GAS BEARINGS
Robert J. Benatti, East Northport, N.Y., assignor to Sperry Rand Corporation, Great Neck, N.Y., a corporation of Delaware
Filed May 29, 1962, Ser. No. 198,678
3 Claims. (Cl. 308—9)

This invention relates to an improvement in gas bearings of the hydrodynamic pressure type by which the condition known as half speed whirl is inhibited without a resulting loss in load carrying capacity.

In bearings of the designated type, the spacing between the relatively moving elements is provided by a gas film having a primary load supporting zone of positive pressure and a zone of negative pressure. The housing for bearings of this character provides a closed receptacle for a suitable compressible gas such as hydrogen that is internally pressurized in the manner stated as the moving element of the bearing is driven with respect to the stationary element by a rotating means to accelerate it from a standstill condition up to its designed operating speed of rotation. Gas bearings of the hydrodynamic pressure type operate to provide a zoned film between the elements in accordance with the principles disclosed in U.S. Letters Patent No. 2,884,282, issued April 28, 1959, to H. Sixsmith, without requiring an external pressure source.

As the moving element of such a bearing is accelerated from standstill to operational or design speed, a whirl condition of inherent instability can be encountered where the eccentricity between the axial centers of the respective elements increases and the center of the rotating element orbits about the center of the fixed element at a speed equal to one-half the rotational speed of the rotating element. At the whirl speed, there is a decrease in the extent of the positive supporting pressure and a resulting loss in the load carrying capacity of the bearing. At this time, the elements may be displaced sufficiently to contact and seize. The primary object of the present invention is to provide a bearing of the character described in which the moving element can be accelerated to reach its designed speed of rotation without experiencing the half speed whirl effect and its resulting possible damage from operational seizure.

A further object of the invention is to provide a gas bearing with a moving element that accelerates through an operational range from lift speed to the design speed of rotation without experiencing the termed half speed whirl.

To produce the additional lift provided in the improved bearing, the respective end areas of one of the bearing elements includes a plurality of pocket providing channels in its curved periphery with an open end and an interior end wall. As the rotating element of the primary bearing accelerates above lift speed, the gas compressed in the included end pockets exerts a radially directed secondary positive pressure on the rotating element that produces this result.

Figure 3:
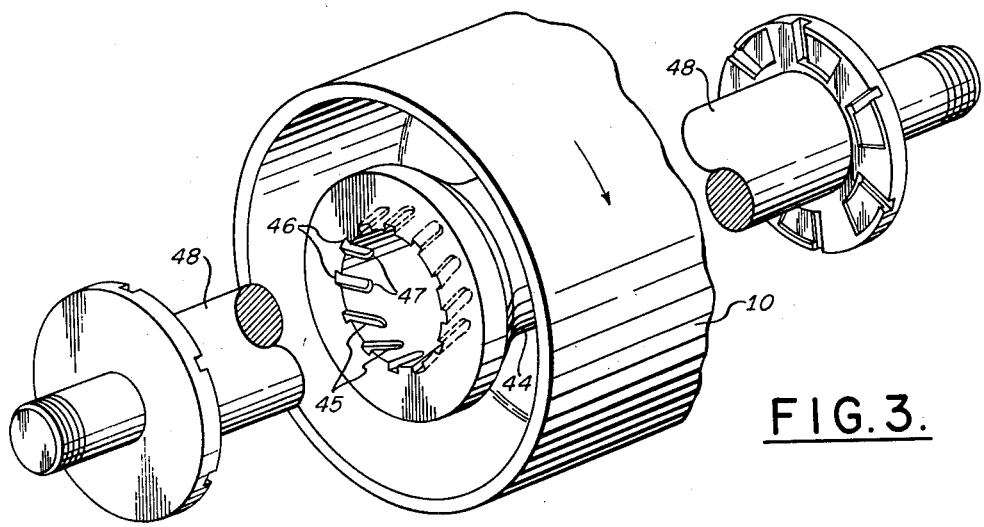
Figure 2:
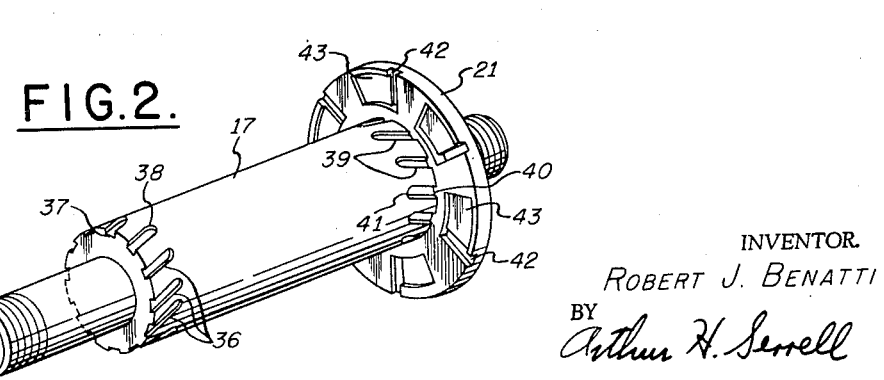

Further objects, features and structural details of the improved gas bearing will be apparent from the following description when read in relation to the accompanying drawing, wherein:

FIG. 1 is a cross sectional view showing the embodiment of the invention in which the additional lift providing channels are provided in the stationary element of the improved gas bearing, FIG. 2 is an enlarged detail perspective view of the stationary element or shaft shown in FIG. 1, and FIG. 3 is a view similar to FIG. 2 showing an embodiment of the invention in which the lift providing channels are provided in the rotating element of the improved gas bearing.

In the exemplary structure illustrated in FIG. 1, a rotor 10 of the gyroscopic type is mounted to spin about an axis provided by the improved gas bearing in a relatively fixed body 11. The hub portion of the rotor 10 provides the movable element or journal 12 of the bearing which includes an axial bore with a primary circumferential central area 14 and respective secondary circumferential end areas 15 and 16. The relatively stationary structure of the improved bearing is shown in the drawing as a bearing element in the form of a fixed shaft 17 that threads the bore of the moving element 12. The stationary body structure 11 includes interfitting frame 18 and sleeve 19 parts that in connected relation form a closed housing or receptacle for the compressible gas utilized in the bearing to provide the pressurized hydrodynamic lift necessary for its operation. The connected frame and sleeve parts of the body structure also provide a closed receptacle in which the respective movable and stationary elements of the improved bearing are housed.

In the form of the bearing shown in FIG. 1, further stationary structure represented therein include a pair of axially spaced thrust pads 20, 21, a pair of wound stators 22, 23 and an individual mounting piece for each of the stators 22, 23 indicated respectively at 24 and 25. The pads 20 and 21 have axial openings that thread the reduced diametric ends of the cylindrical shaft 17 and fit in axially spaced condition against the shoulders provided on the shaft in juxtaposed relation to the respective circumferential end areas of the movable element 12. The stator mounting pieces, pads and shaft are connected together as an assembly with spacers 26 and 27 between the respective pad 20, piece 24 and pad 21, piece 25 by means of the respective threaded end fastenings indicated at 28 and 29. This assembly is fixedly connected to the receptacle or housing of the bearing by two screw fastenings 30, 31 between the frame 18 and mounting piece 24 and two screw fastenings 32, 33 between the frame 18 and the mounting piece 25. The stationary cylindrical element or shaft 17 of the bearing is accordingly connected in fixed relation to the housing or body 11. The portion of the stationary shaft 17 between the thrust pads 20, 21 threads the bore of the movable element or journal 12 of the bearing.

The means for rotating the rotor 10 and journal element 12 of the bearing includes a hysteresis ring 34 for the wound stator 22 and a hysteresis ring 35 for the wound stator 23. Rings 34 and 35 fit against respective spaced internally flanged portions of the rotor 10 and with the respective stators 22 and 23 provide a means for rotating the movable element of the bearing in the form of a pair of hysteresis motors that are energized from a suitable source of alternating current electrical energy to accelerate the rotor 10 from a standstill condition to its designated operating speed of rotation. As represented in FIG. 1, the improved bearing is shown in operative condition with the rotor 10 spinning at its designed speed. As a characteristic of the described type of bearing, the rotation of the journal provides a compressed film of hydrodynamically pressurized gas between the elements having a zone of positive pressure at the circumferential central area 14 of the moving element that supports the rotor 10 as well as a zone of negative pressure at the circumferential central area 14 of the moving element. In bringing the rotor up to speed from a standstill condition, the bearing elements remain in contact until the sufficient positive gas pressure is hydrodynamically produced at the noted area to lift the journal 12 off the shaft 17. This point in the operation of the bearing is known as the lift speed which occurs at a lower speed than the threshold whirl speed of the rotor. The lifting pressure then increases as the rotor further accelerates up to its designed speed of rotation. As the rotor accelerates to its design speed half speed whirl occurs in conventional bearings of the hydrodynamic type with its resulting loss in lifting pressure. In accordance with the present invention, a plurality of channels are included in one of the bearing elements for providing pocket of radially directed positive hydrodynamic gas pressure at the respective end areas 15 and 16 of the journal 12 to inhibit the heretofore described whirl condition.

In the embodiment of the invention shown in FIGS. 1 and 2, the channels providing the radially directed lift pressure pockets are located in the curved periphery of the shaft 17. The channels for the end area 15 of the bearing member or journal 12 as indicated at 36 are arranged in symmetrical corresponding diagonal relation to the axis of the shaft with an open exterior end 37 and an interior end wall 38. Exemplary physical dimensions for the channels where the axial dimensions of the bearing portion of the shaft is one and five-eighths of an inch are one ten-thousandth of an inch in depth, eight-hundreths of an inch in width and one-eighth of an inch in axial length with the helix angle thereof to the rim of the shaft being forty-five degrees. In this form of the invention, the journal and rotor 10 rotate in a counterclockwise direction with respect to the angularly disposed channels 36 in the shaft so that as the journal rotates each channel becomes a pocketed zone of radially directed positive hydrodynamic gas pressure with regard to circumferential end area 15 of the journal. The positive pressure zones provided by the channels 36 produce a resultant lift that is dependent on the speed of rotation of the journal and the extent of the eccentricity between the axes of the shaft and journal. As shown in FIGS. 1 and 2, a corresponding plurality of pocket-providing channels 39 are located in the curved periphery of the shaft 17 for the circumferential end area 16 of the journal. Each of the channels 39 have an open exterior end 40 and an interior end wall 41. The diagonal relation of the channels 39 to the shaft 17 is opposite to that of the channels 34 in order that the same provide the equivalent hydrodynamic gas pressure pockets for the circumferential end area 16 of the bearing that are provided for the end area 15. The axial length of the channels corresponds to the axial dimensions of the respective end areas 15 and 16 of the journal. In operation, the axially spaced pressure pockets provided by the channels exert radial lift where required to maintain the gas film between the rotating and stationary parts after the rotor attains its lift speed of rotation. In this embodiment of the invention, the channels providing the positive pressure pockets are located on the fixed bearing element or shaft 17. As shown in FIG. 1, the movable element or journal 12 of the improved bearing is axially positioned by means of the axially spaced thrust pads 20 and 21. The respective flat circumferential end areas of the journal 12 in the arrangement shown are located in juxtaposed relation to the flat faces of the spaced pads which respectively include radial channels 42 and related pressure pockets 43 as particularly shown for pad 21 in FIG. 2. The axially directed hydrodynamic gas pressures provided in the pockets 43 of the pads 20 and 21 with rotation of the rotor 10 maintains the journal 12 so that the axial spacing between the parts is equidistant.

In the embodiment of the invention shown in FIG. 3 equivalent channels to those shown in FIG. 2 providing the radially directed pressure pockets for the respective end areas of the journal 12 are located in the movable element or journal itself. The channels shown only at one end of the journal 44 in FIG. 3 are indicated at 45, with the open exterior end thereof being indicated at 46 and the interior end wall being indicated at 47. Here, the cooperating shaft or fixed bearing element 48 is unchanneled and the helix angle is such that as the rotor accelerates in a clockwise direction as indicated by the arrow in FIG. 3 gas enters the channels through the respective open exterior ends thereof for hydrodynamic pressurization.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. A gas bearing of the hydrodynamic pressure type including an element movable about an axis having an axial bore with a primary circumferential central area, respective secondary circumferential end areas and radial end areas, a housing for the movable element providing a closed receptacle for a compressible gas, a cylindrical bearing element connected in fixed relation to the housing threading the bore of the movable element, a plurality of pocket providing channels with respective open exterior ends and respective interior end walls in the curved periphery of one of the elements of an axial length corresponding to the axial dimension of one of the secondary circumferential end areas of the movable element arranged in symmetrical corresponding diagonal relation to the axis of the element, a corresponding plurality of pocket providing channels with respective open exterior ends and respective interior end walls in the curved periphery of the one of the elements of an axial length corresponding to the axial dimension of the other of the secondary circumferential end areas of the movable element arranged in symmetrical corresponding diagonal relation to the axis of the element opposite to that of the one of the secondary channels, a pair of axially spaced thrust pads mounted on the fixed bearing element in juxtaposed relation to the respective radial end areas of the movable element, and means for rotating the movable element with respect to the bearing element at a speed that provides a film of gas therebetween having zones of positive and negative hydrodynamic gas pressure at the primary circumferential central area of the moving element, having pocketed zones of positive hydrodynamic gas pressure at the respective secondary circumferential end areas of the moving element exerted radially of the axis, and having zones of opposing positive hydrodynamic gas pressure between the respective pads and the radial end areas of the movable element exerted along the axis.

2. A gas bearing of the hydrodynamic pressure type including a journal having an axial bore with a primary circumferential central area, respective secondary circumferential end areas and radial end areas, a closed receptacle for a compressible gas housing the journal, a shaft connected in fixed relation to the receptacle threading the bore of the journal, a plurality of pocket providing channels with respective open exterior ends and respective interior end walls in the curved periphery of the shaft of an axial length corresponding to the axial dimension of one of the secondary circumferential end areas of the journal arranged in symmetrical corresponding diagonal relation to the axis of the shaft, a corresponding plurality of pocket providing channels with respective open exterior ends and respective interior end walls in the curved periphery of the shaft of an axial length corresponding to the axial dimension of the other of the secondary circumferential end areas of the journal arranged in symmetrical corresponding diagonal relation to the axis of the shaft opposite to that of the channels of the one of the secondary circumferential end areas, a pair of axially spaced thrust plates fixedly mounted on the shaft in juxtaposed relation to the respective radial end areas of the journal, and means for rotating the journal with respect to the shaft at a speed that provides a film of gas therebetween having zones of positive and negative hydrodynamic gas pressure at the primary circumferential central areas of the journal, having pocketed zones of positive hydrodynamic gas pressure at the respective secondary circumferential end areas of the journal exerted in a direction radial to the axial bore, and having zones of opposing positive hydrodynamic gas pressure between the respective plates and the radial end areas of the journal exerted along the axial bore.

3. A gas bearing of the hydrodynamic pressure type including a journal having an axial bore with a primary circumferential central area, respective secondary circumferential end areas and radial end areas, a closed receptacle for a compressible gas housing the journal, a shaft connected in fixed relation to the receptacle threading the bore of the journal, a plurality of pocket providing channels with respective open exterior ends and respective interior end walls in the curved periphery of the journal of an axial length corresponding to the axial dimension of one of the secondary circumferential end areas thereof arranged in symmetrical corresponding diagonal relation to the axial bore of the journal, a corresponding plurality of pocket providing channels with respective open exterior ends and respective interior end walls in the curved periphery of the journal of an axial length corresponding to the axial dimension of the other of the secondary circumferential end areas thereof arranged in symmetrical corresponding diagonal relation to the axial bore of the journal opposite to that of the channels for the one of the secondary circumferential end areas, a pair of axially spaced thrust plates fixedly mounted on the shaft in juxtaposed relation to the respective radial end areas of the journal, and means for rotating the journal with respect to the shaft at a speed that provides a film of gas therebetween having zones of positive and negative hydrodynamic gas pressure at the primary circumferential central areas of the journal, having pocketed zones of positive hydrodynamic gas pressure at the respective secondary circumferential end areas of the journal exerted in a direction radial to the axial bore, and having zones of opposing positive hydrodynamic gas pressure between the respective plates and the radial end areas of the journal exerted along the axial bore.

References Cited in the file of this patent
UNITED STATES PATENTS

| | | |
|---|---|---|
| 2,479,349 | Hagg | Aug. 16, 1949 |
| 3,048,043 | Slater et al. | Aug. 7, 1962 |